Sept. 19, 1961   C. L. BASILE ET AL   3,000,405
APPARATUS FOR STRIPPING INSULATION FROM WIRE
Original Filed June 16, 1955   2 Sheets-Sheet 1
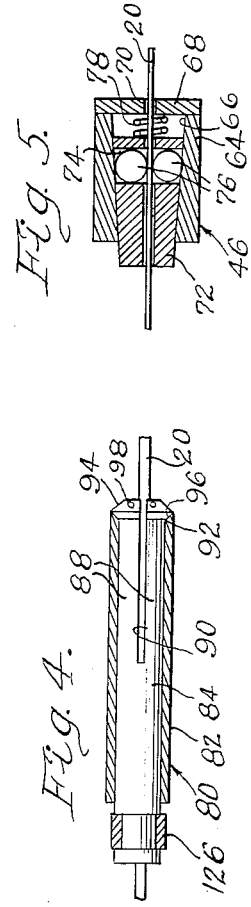
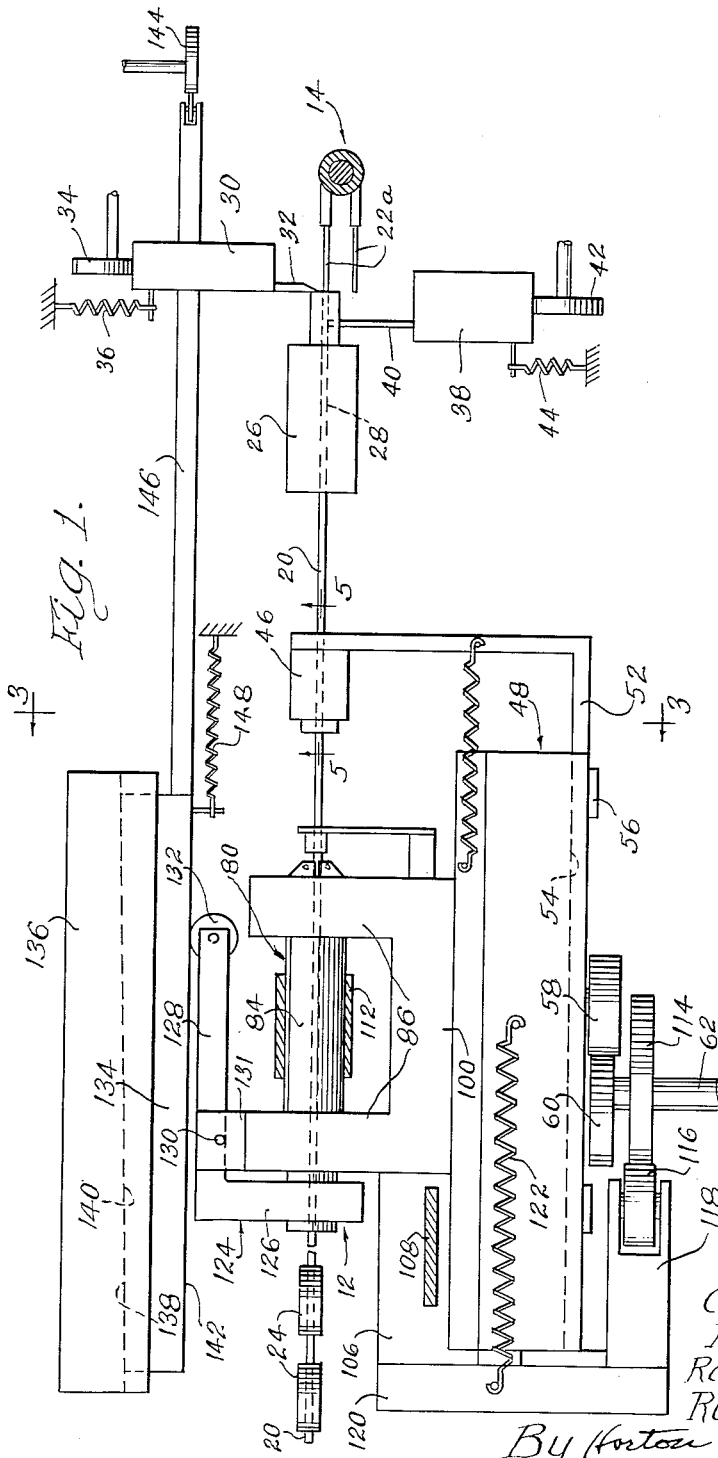
Carmen L. Basile
Pankracy Terry
Ralph R. Tullgren
Robert R. Kaufmann
By Horton, Davis, Brewer & Brugman Att'ys.

Sept. 19, 1961   C. L. BASILE ET AL   3,000,405
APPARATUS FOR STRIPPING INSULATION FROM WIRE
Original Filed June 16, 1955   2 Sheets-Sheet 2
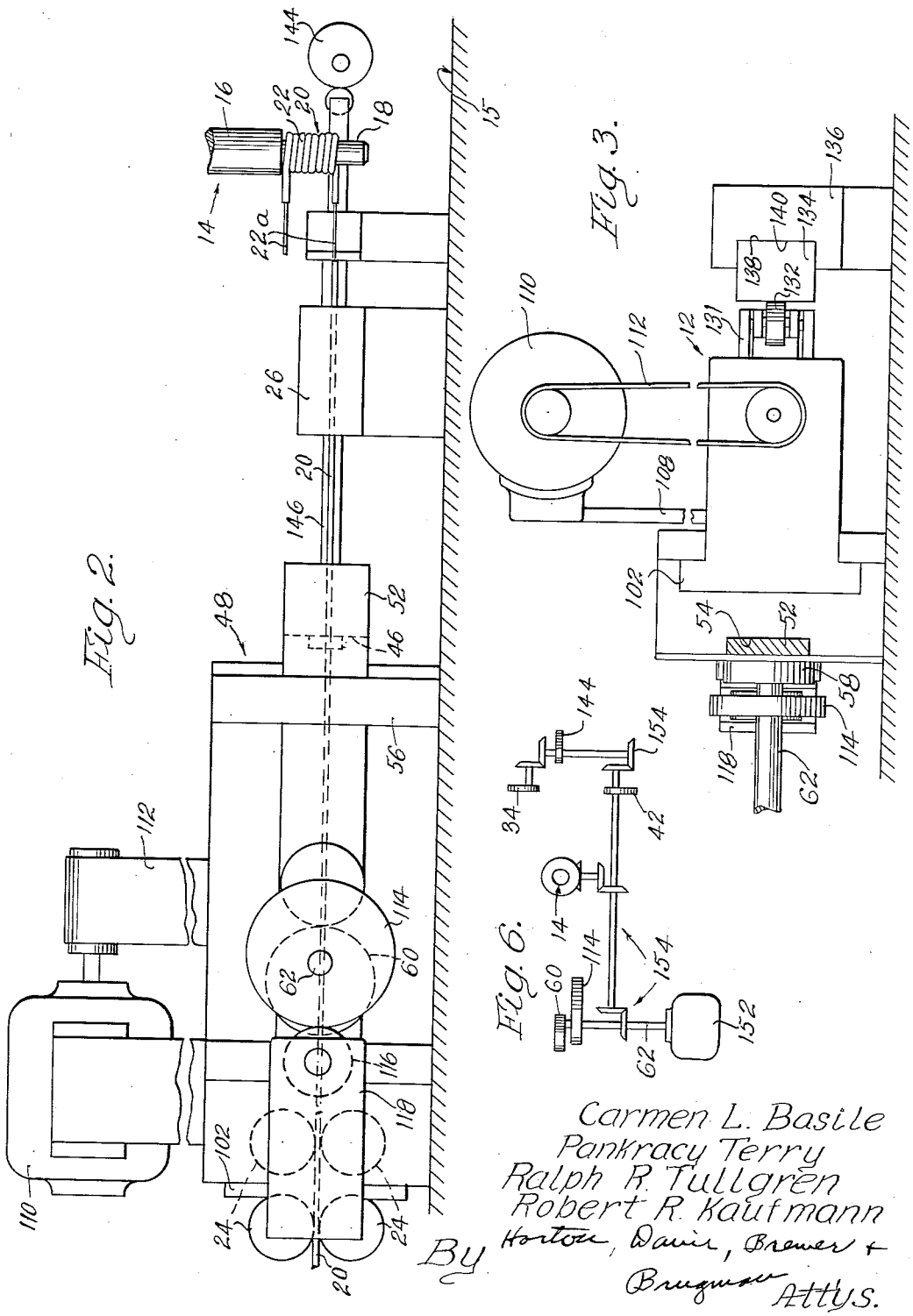
Carmen L. Basile
Pankracy Terry
Ralph R. Tullgren
Robert R. Kaufmann
By Horton, Davis, Brewer & Brugman Attys.

United States Patent Office 3,000,405
Patented Sept. 19, 1961

3,000,405
APPARATUS FOR STRIPPING INSULATION
FROM WIRE
Carmen L. Basile, Pankracy Terry, Ralph R. Tullgren, and Robert R. Kaufmann, all of Chicago, Ill., assignors to Taylor Spring and Manufacturing Company, Chicago, Ill., a corporation of Illinois
Original application June 16, 1955, Ser. No. 515,996, now Patent No. 2,935,786, dated May 10, 1960. Divided and this application Sept. 8, 1959, Ser. No. 838,455
9 Claims. (Cl. 140—1)

This application is a division of our co-pending application Serial No. 515,996, filed June 16, 1955, now Patent No. 2,935,786.

The present invention relates to stripping insulation from wire, and more particularly to apparatus for stripping insulation from wire.

The invention has to do with stripping insulation at selected locations on the wire, as distinguished from total stripping, and as such is especially adapted to incorporation in other apparatus for treating wire. For example, wire of the type herein considered may be shaped into coils for use as electrical conductors in appliances (e.g., television receiving sets) and as such must have their terminal portions stripped of insulation and exposed for connection with other elements in an electrical circuit. The formation of the coils is done at a high rate of speed, and the coils are produced from continuous wire. It is desired that the stripping operation be coordinated with the shaping of the wire, i.e., the wire be run only once from the aggregate to the finished product, and it is of course desired that the stripping operation not impede the shaping operation.

It is an object of the invention to provide novel apparatus for realizing the above considerations.

A further object is to provide apparatus of the foregoing character, arranged for stripping insulation as stated without limitation by the shaping operation.

Another object is to provide apparatus of the foregoing character capable of performing clean-cut stripping of the wire, and more particularly, in conjunction with a shaping operation in which the wire is fed intermittently, arranged so as to perform the stripping operation while the wire is stationary, with the result that the stripping operation is not affected by movement of the wire made for another purpose.

Still another object is to provide apparatus for stripping wire capable of more effectively stripping wire of the smallest gauge than has been possible heretofore.

A still further object is to provide apparatus for stripping portions of continuous wire, in conjunction with an operation for shaping the wire in which feeding means is provided for feeding the wire to a station for shaping, having novel arrangement and construction in which a stripper moves along the wire and the same feeding means that feeds the wire to the shaping station serves as means for holding the wire against the action of the stripper, whereby to render more effective the independence of the shaping and stripping actions.

Other objects and advantages of the invention will appear from the following detail description taken in conjunction with the accompanying drawings in which:

FIGURE 1 is a plan view, partially diagrammatic, of apparatus embodying the present invention;

FIG. 2 is a side elevational view also semidiagrammatic, of the apparatus shown in FIG. 1;

FIG. 3 is a view taken on line 3—3 of FIG. 2, showing the essential portions of the elements viewed in that direction;

FIG. 4 is a detail view of the stripping tool per se;

FIG. 5 is a sectional view taken on line 5—5 of FIG. 1; and

FIG. 6 is a diagrammatic illustration of means for driving the various parts of the mechanism in predetermined timed relationship.

Referring now in detail to the drawings, the apparatus illustrated includes the stripping means of a previous invention made by the present Basile and Terry, and claimed in Patent No. 2,703,026 dated March 1, 1955. Reference may be had to that patent for details of the stripping mechanism, but the essentials thereof will be explained herein, sufficient for understanding the present invention. As in the previous invention, the present apparatus is adapted for use in stripping insulation from electrical wire in conjunction with a mechanism for shaping the wire. The machine to which the apparatus of the present invention is adapted may be the same as referred to in the prior patent mentioned above, namely the shaping machine identified as Torsion Spring Machine, Series 614, put out by Sleeper and Hartley, Inc., Worcester, Massachusetts.

The stripping mechanism referred to and claimed in the prior patent is indicated herein generally at 12. The shaping machine includes a mandrel 14 for shaping the wire which in the present instance is a coiling operation. The mandrel includes an outer sleeve 16 and a central spindle 18, the wire 20 being fed to the mandrel at a shaping station for forming the coil 22 on the mandrel. Upon completion of the coil and cutting the wire pursuant thereto as will be brought out later in detail, the coil is ejected from the mandrel by a suitable operating mechanism on the shaping machine. A suitable drive is provided for operating the mandrel as well as other apparatus including principally various cams, all of which are synchronized in a certain predetermined cycle of operation. For purposes of identification the shaping machine may be considered as having a deck 15 upon which the stripping mechanism 12 and its associated parts are mounted.

The wire 20 is a continuous wire fed from a suitable source of supply such as a large spool and fed to the mandrel along a predetermined path which for purposes of convenience in using the stripping apparatus is a straight line. The wire is fed in advancing direction which in FIGS. 1 and 2 is from left to right and it will be noted that the stripping mechanism 12 is disposed anterior to the shaping station for enabling a long range of sliding movement of the stripping mechanism, as will be explained in detail later. Suitable rollers 24 are provided for straightening the wire as it approaches the stripping mechanism, and the wire after passing through the straightening rollers 24 is threaded through the stripping mechanism 12 and fed to the mandrel 14. Adjacent the mandrel but spaced therefrom in an anterior direction with respect to the direction of wire feed is a suitable guide means 26 having a central aperture 28 for receiving the wire and guiding it to the mandrel. The end of the guide means adjacent the mandrel may serve as an anvil for cooperating with a cutoff mechanism 30 for cutting the wire following shaping of the coils 22. The cut-off mechanism 30 has a cutting element 32 and is moved in cutting direction (toward the observer—FIG. 1) by means of a cam 34 operated by the driving means of the shaping machine. The cutting mechanism is retracted by suitable means such as a spring 36.

Also cooperating with the guide means 26 is a gripper 38 having a reduced extension 40 projected into an aperture in the guide means and arranged for gripping the end portion of the wire at that location. The gripper 38 is actuated by means of a cam 42 also driven by the drive means of the shaping machine. The gripper is actuated prior to the cutting-off operation of the cutting means 30, for retaining the wire against accidental retraction after the coil is cut off. The gripper 38 is retracted as by means of a tension spring 44, upon release of the moving force of the cam 42, to enable the wire 20 to be again advanced to the mandrel 14.

The means for feeding the wire to the mandrel 14 is designated generally at 46 and is mounted on the same supporting means that supports the stripping mechanism 12, namely the main base 48. The stripping mechanism 12 is also anterior to the feeding means 26, to the end of providing a long range of movement of the stripping mechanism as mentioned above, and its location also provides an arrangement whereby an unusually heavy base 48 may be provided for solidly supporting the various elements.

The feeding means 46 is mounted on the end of an arm 50 forming an extension of a longitudinal member 52 in the form of a slide mounted in a groove 54 (FIG. 3) in the base 48. The slide is retained in the groove by suitable elements 56 and is provided with a cam follower 58 for engagement by a rotary cam 60 mounted on a shaft 62 driven by the drive means of the shaping machine. The base 48 is of course disposed in longitudinal direction, considering the direction of feed of the wire so that upon sliding movement of the slide 52 and arm 50, the feeding means 46 is moved in the direction of the path of the wire so as to feed the wire to the mandrel.

The feed means 46 is unidirectional in nature, adapted to grip the wire 20 and feed it in advancing direction (to the right) while capable of being withdrawn (to the left) without so moving the wire and also permitting the wire to be drawn therethrough in advancing direction (to the right). One form of suitable feeding means is shown in FIG. 5 which is a cross sectional view on line 5—5 of FIG. 1 through the feed means 46. The feeds means as thus constructed includes a housing 64 of generally tubular shape having a longitudinal bore therethrough of conical or tapered shape, diverging in advancing direction, through which the wire 20 is fed. The forward end of the feed means may be closed by a plate-like element 68 which may conveniently be an extension of the arm 50 and provided with a central aperture for reception of the wire 20. In the bore is a movable member 72 tapered complementally to the tapered surface 66, having a central bore for receiving the wire. The element 72 has a cell 74 in which is a pair of cylinders or rollers 76 disposed on opposite sides of the wire 20. A compression spring 78 urges the plunger element 72 toward the smaller end of the bore, thereby wedging the rollers 76 inwardly toward each other into gripping engagement with the wire, the rollers being in engagement with the surface 66. Upon movement of the feed means in advancing direction (to the right) the rollers being wedged by the surface 66 engage the wire and draw or feed it in the same direction. In retracting direction (to the left) the feed means glides over the wire, the friction between the wire and rollers operating to draw the plunger element 72 toward the larger end of the bore 66, permitting the rollers to separate and permitting the feed means to move in retracting direction without drawing the wire in that direction. The same relative movement takes place when the feeding means is stationary and the wire is drawn therethrough in advancing direction by the coiling arbor 14. The feed means 46 is moved in advancing direction (FIG. 1) by the cam 60 acting through the cam follower 58, as mentioned above, in a predetermined portion of the operating cycle and it is moved to retracted position by the tension spring 80 interconnected between the arm 50 and a suitable fixed element, such for example as the main base member 48.

Referring in detail to the stripping mechanism 12 this mechanism is arranged for the wire 20 to be drawn therethrough. The stripping mechanism includes a stripping tool proper 80 which is shown partially in section in FIG. 4. The stripping tool includes an outer sleeve 82 and tubular element 84 therein. The details of this structure as mentioned above are described in detail in the Basile and Terry patent referred to above, but a brief description of the essentials thereof are set out here for convenience. The sleeve 80 is mounted for rotation in a pair of arms 86 and the inner tubular member 84 is mounted for rotation therewith, being suitably keyed for that purpose but permitted longitudinal sliding movement in the sleeve. The tubular member 84 includes a plurality of longitudinally extending fingers 88, formed by slots 90, adapted for limited springing movement in radial direction. The end of the sleeve 82 has a conical surface 92, and the tubular member 84 has a head portion 94 at the extremity of the spring fingers 88 the fingers together having a complementary conical surface 96 for engagement with the conical surface 92. The ends of the fingers 88 in the head portion 94 are provided with cutting bits 98 disposed radially and having their inner ends positioned for engagement with the wire 20 for stripping the insulation therefrom. The inner tubular member 84 is arranged for contracting movement (to the left—FIG. 4), whereupon the conical surface 96 engages the conical surface 92 and contracts the ends of the fingers 88 radially inwardly, thereby bringing the inner ends of the bits 98 into engagement with the wire. Upon release of the contracting force, the inherent resiliency in the fingers 88 causes them to move radially outwardly, and a camming action produced by the conical surfaces moves the tubular member axially in the opposite direction.

The means for mounting the stripping tool proper 80 includes the arms 86 mentioned above and these arms may conveniently be extensions of a block 100 forming the body of the stripping mechanism. This block 100 is mounted for longitudinal sliding movement in the base 48 by suitable means such as the construction illustrated in FIG. 3 where the inner end of the block 100 has longitudinally extending flanges 102 confined in a groove 104 in the base. The block 100, which is diagrammatically shown and may assume dimensions different from those illustrated in the drawings, has a longitudinal extension 106 which supports a standard 108 mounting a drive means such as an electric motor 110 which drives the cutting tool 80 by means of a belt 112. The motor 110 is mounted on the same block or carriage that supports the stripping tool 80 and moves therewith. The drive for the stripping tool is thus independent of the drive of the shaping machine, and the rotation of the stripping tool therefore is not affected by the cycle of operation of the machine as a whole, but is rotated constantly and functions to strip the insulation from the wire when the bits are in engagement therewith and relative movement is produced between the stripping mechanism and the wire. This relative movement in the present invention is established when the wire is maintained stationary and the stripping mechanism is moved along the wire. The stripping direction of movement of the mechanism is to the left (FIG. 1), or opposite the direction of feed of the wire. The means for so moving the mechanism takes the form of a cam 114 which may be on the same shaft 62 which mounts the cam 60. The cam 114 operates through a cam follower 116 mounted in an arm 118 in turn supported by a cross piece 120 secured to the extension 106. Upon rotation of the cam 114 at the effective portion of the cycle of operation of the shaping machine, the stripping mechanism 12 is moved in stripping direction. Upon return of the cam 114 the stripping mechanism is moved in the opposite or retracting direction by means of a tension spring 122 connected between the stripping mechanism or element connected thereto such as cross piece 120, and a fixed point which may be on the base 48.

The actuating means for moving the cutting tool into operating engagement with the wire includes a lever 124 preferably of L shape for adapting the various parts of the device to longitudinal movement of the stripping means or mechanism. This lever 124 includes one arm 126 suitably connected with the tubular member 84, as indicated diagrammatically in FIG. 4, and another arm 128 extending longitudinally of the stripping mechanism and in the general direction of movement thereof. The lever may be suitably mounted for swinging movement about a vertical pivot 130 provided in convenient mounting means such as lugs 132 formed on the block 100. The extended end of the lever arm 128 supports a roller 132 serving as a cam follower engaging a slide 134. The slide is arranged so that upon adjustment thereof in appropriate direction the stripping tool is brought into operative engagement with the wire.

The slide 134 is mounted in a slide block 136 for sliding movement longitudinally along the line of feed of the wire, for controlling actuation of the lever 124. More specifically, the slide and slide block have inclined surfaces 138 and 140, respectively, disposed at an angle to the longitudinal directional movement of the stripping mechanism, while the slide has an outer control surface 142 disposed accurately longitudinally of the line of movement of the stripping mechanism and engaged by the roller 132. It is actuated by a suitable means such as a cam 144 driven by the drive means of the shaping machine and acting through a link 146 connected by suitable connection with the slide. Upon rotation of the cam 144 and at a predetermined portion of the cycle of operation of the machine, the slide 134, through the link 146 is moved to the left (FIG. 1), and the inclined surfaces 138 and 140 operate to move the slide 134 in "expanding" direction, that is, in direction toward the stripping mechanism 12. Upon release of the force thus supplied by the cam 144, the slide 134 is moved to "contracting" direction by means of a tension spring 148 interconnected between the slide and a fixed point on the machine. Upon movement of the slide 134 in expanding direction, as noted, it produces an inward swinging movement of the lever arm 128, and the lever 124 is rotated in clockwise direction (FIG. 1); the lever arm 126 on thus being moved in a similar direction draws the tubular element 84 (FIG. 4) to the left for contracting the tool bits 98 for moving them into operating engagement with the wire 20. Thus upon movement of the slide 134 to expanded position, and consequent movement of the cutting bits into operating engagement with the wire, the stripping mechanism 12 may be moved longitudinally along the wire and produce a stripping action on the wire throughout its range of movement. Upon release of the force supplied by the cam 144, the slide 134 is moved to contracted position by the spring 148 which permits the lever 124 to move in counterclockwise direction, whereupon the tubular member 84 (FIG. 4) is permitted to move to retracted position for withdrawing the bits from the wire in the manner mentioned above. A suitable guide 150 may be mounted on the stripping mechanism 12 for receiving the wire upon emergence from the stripping mechanism for aiding in guiding the wire with precision.

In the use of the apparatus including both the shaping machine and the stripping mechanism, the wire is threaded through the stripping mechanism, wire guide 150, feed means 46, guide 26, and to a position adjacent the mandrel 14. The wire is gripped by the mandrel 14 for coiling the wire in a manner characteristic of the shaping machine which does not constitute an essential part of the present invention. However, the wire is drawn by the mandrel in the shaping operation, and during this operation, the feed means is retracted to a starting position for again gripping the wire for a successive feeding operation. The feed means 46 is actuated in advancing direction for moving the wire in that direction. This movement of the wire may be a small amount relative to the length of the wire making up the coil 22, the feed of the feed means being sufficient for the wire to be gripped by the mandrel 14. After this has taken place the feed means 46 is stopped and retracted, as noted. When the coiling operation is completed, and the wire is stationary, the mechanism 12 is brought into operation and the entire stripping operation takes place while the wire is stationary. It will be understood that the stripping is produced at spaced portions along the wire and the wire is cut intermediate the ends of the stripped portions so that the ends of the coil 22 will have stripped terminal portions 22a (FIGS. 1 and 2).

In FIG. 6, which shows diagrammatically the means for driving the various parts of the apparatus in predetermined timed relationship, the cams referred to above are illustrated, as well as the driving means, including common motor means which may be an electric motor 152. Conventional drive means 154 connect the motor 152 with respective driven parts.

The cycle of operation and the relation between the steps of the various elements in the cycle are as follows:

(a) The gripping means 38 is moved to retracted position which releases the wire 20. The purpose of the gripping means 38 is to retain the end of the wire 20 in position in the guide 28 after the coil 22 has been cut therefrom and while the feed means 46 may be moving in retracting direction. This is accomplished by the extension 40 projecting through an aperture in the guide and engaging the wire and holding it against the surface of the bore therein.

(b) The wire is fed in advancing direction (to the right—FIG. 1) by the feed means 46; this is accomplished through the cam 60, cam follower 68, and arm 50.

(c) The wire advancing through the guide 26 is gripped by the arbor, and thereupon a coil 22 is formed. In this movement the arbor draws the wire through the feed means 46 and upon the wire being gripped by the arbor, the feed means moves to retracted position.

(d) The cam 144 is actuated for moving the slide 134 to expanded position which, acting through the arm 124, moves the tubular element 84 (FIG. 4) into wire-engaging, stripping position.

(e) The gripping means 38 is moved by means of the cam 42 into position gripping the wire in the guide 26.

(f) The cutting means 30 actuated by the cam 34 cuts the wire so as to sever the coil from the remaining aggregate of the wire 20. (After this step the arbor operates to eject the coil 22 and the wire 20 remains stationary.)

(g) While the wire remains stationary, the cam 114 operates to move the stripping mechanism 12 in stripping direction (to the left—FIG. 1) and the wire 20 is stripped throughout a portion corresponding to the range of movement of the stripping mechanism.

(h) When the stripping mechanism reaches its limit of movement, the cam 144 recedes to permit retraction of the slide 134 and release of the cutting tool from the wire and at about the same time the gripping means 38 is released from position gripping the wire 20.

(i) The feed means 46 is again actuated for feeding the wire 20 in advancing direction through the arbor 14 and during this movement the stripping mechanism 12 is moved to starting position (to the right—FIG. 1) so as to be in position for later movement in stripping direction. There is no specific relation between the movement of the stripping mechanism 12 and the feed means 46 other than that while the wire is being fed, the stripping operation is not being performed, and this portion of the cycle is utilized for moving the stripping mechanism to starting position.

The rollers 24 are shown spatially adjacent the stripping mechanism 12 but it will be understood that these may be placed at any convenient location and in fact are disposed at quite a distance from the starting position of the stripping mechanism 12. The arrangement of the various elements is such that the stripping mechanism 12 is provided with a substantial range of movement and this is an important features of the invention. The length of any stripped portion is limited only by the range of movement of the stripping mechanism and in fact the upper deck of the shaping machine may be provided with an extension for providing movement of the stripping mechanism to any desired extent, within practical limits. The stripping operation therefore is not limited by the shaping operation and any one stripped portion may be of any length regardless of the length of material forming the shape (coil 22). For example, whether a long coil with short terminal stripped portions is formed, or a short coil with long terminal stripped portions, the cycle of operation may be set up to provide movement of the stripping mechanism 12 of the desired extent regardless of the length of the coil. Contrast is made with a situation wherein the stripping operation is performed while the wire is in motion. In such situation, the length of the wire is determined, of course, by the length of material utilized in the coil and whether this is little or great will affect the limits of the stripping operation.

Another important advantage of the arrangement wherein the stripping operation is performed while the wire is stationary resides in the fact that the ends of the stripped portion are well defined and accurate, that is, the ends of the insulation remaining on the wire is clean-cut and well defined. Because of this arrangement, greater latitude is permitted in the operation of moving the stripping tool into operative engagement with the wire as compared with doing so while the wire is moving. Both ends of the stripped portion are affected similarly, that is, whether the stripping elements are brought into engagement with the wire or removed therefrom, the same conditions prevail with respect to forming a clean-cut and well defined line of demarcation between the insulation remaining on the wire and the stripped portion. It will be understood that in wire of the gauge capable of being stripped by the present apparatus, a small variation in the length of insulation may be great compared with the dimension of the wire and widely affect the ease of making an accurate connection of the wire in a practical apparatus. Wire as small as .002" in diameter may readily be accommodated by the apparatus, and a coil of wire of this dimension may well be greatly affected by an ill-defined stripped portion, as in connecting it to a binding post.

Another important advantage of the invention is that unusually small wire may be accommodated with the same accuracy in the stripping operation. Since the cutting tool is brought into operative engagement with the wire while the wire is stationary, there is not the requirement for accuracy in limits of movement of the bits as would be the case if they were brought into operative engagement with the wire while the wire is moving or while relative movement exists between the wire and the stripping mechanism. And in the case of wire of any gauge, the depth of cut is more accurately controlled because since the cutting elements are moved into stripping engagement with the wire while the stripping mechanism and wire are stationary, they may be done more slowly.

We claim:

1. Apparatus for forming coils from continuous electrically conductive insulated wire, each such coil having a central coiled portion and having terminal portions stripped of insulation, comprising fixed base means, coiling means at a coiling station on the base operative for forming a coil from the continuous wire and drawing the wire thereto in an advancing direction in the coiling operation, means for severing the wire at a point anterior to the coiling station relative to the direction of advancement of the wire, unidirectional feeding means positioned anterior to the coiling station operative for feeding the continuous wire in said advancing direction and holding the wire against movement in the opposite and retrograde direction, while enabling the wire to be advanced relative thereto, tubular stripping means anterior to the feeding and holding means including stripping elements rotatable at high speed about the axis of the wire and movable radially into and out of engagement with the wire, the stripping means being movable linearly along the wire and having effectively unlimited range of movement away from the coiling station, means for operating the coiling means intermittently in a series of periods, means maintaining the wire stationary at intervals between said periods, means operating said severing means after each said period and severing the wire in a stripped portion thereof between the ends of the stripped portion, thereby forming a severed coiled article with a central coiled portion and stripped terminal portions, and means operating said stripping means only at the intervals between said periods in which the continuous wire is stationary by moving the stripping elements into engagement with the wire and while they are in such engagement moving the stripping means linearly along the wire in retrograde direction against the holding effect of said holding means and again thereafter moving the stripping elements out of engagement with the wire.

2. The apparatus set out in claim 1 in which means is provided for rotating the stripping elements constantly when they are both in and out of engagement with the wire.

3. The apparatus set out in claim 1 in which the stripping elements are movable inwardly sufficiently to define an aperture at least as small as .016" in diameter, and the stripping elements are relatively rigid in circumferential direction.

4. Stripping and controlling apparatus for use in conjunction with a coiling machine for forming coils from continuous electrically conductive insulated wire of which each has a central coiled portion and has terminal portions stripped of insulation, in which the coiling machine is operative for forming a coil from the continuous wire and drawing the wire thereto in an advancing direction in the coiling operation, said stripping and controlling apparatus comprising, in combination, fixed base means defining a coiling station at the location of the coiling operation by the coiling machine, means for severing the wire at a point anterior to the coiling station relative to the direction of advancement of the wire, unidirectional feeding means positioned anterior to the coiling station operative for feeding the continuous wire in said advancing direction and holding the wire against movement in the opposite and retrograde direction while enabling the wire to be advanced relative thereto, tubular stripping means anterior to the feeding and holding means including stripping elements rotatable at high speed about the axis of the wire and movable radially into and out of engagement with the wire, the stripping means being movable linearly along the wire and having effectively unlimited range of movement away from the coiling station, means operating the coiling means intermittently in a series of periods, means for maintaining the wire stationary at intervals between said periods, means operating said severing means after each said period and severing the wire in a stripped portion thereof between the ends of the stripped portion, thereby forming a severed coiled article with a central coiled portion and stripped terminal portions, and means operating said stripping means only at the intervals between said periods in which the continuous wire is stationary by moving the stripping elements into engagement with the wire and while they are in such engagement moving the stripping means linearly along the wire in retrograde direction against the holding effect of said holding means and again thereafter moving the stripping elements out of engagement with the wire.

5. Apparatus of the character disclosed comprising means for shaping wire at a shaping station, means for intermittently feeding continuous wire to the shaping station, means for operating the shaping means and shaping the continuous wire while the wire is being fed thereto, means anterior to the shaping station for holding the wire against retrograde movement, stripping mechanism anterior to the shaping station movable along the wire and having stripping elements rotatable at high speed about the axis of the wire and movable into and out of operative engagement with the wire and including a lever disposed laterally thereof and movable transversely for moving the stripping elements into said operative engagement, means having a uniform surface parallel with the line of movement of the stripping mechanism disconnectedly engaging the lever, means for moving the last named means transversely when the wire is stationary with its said surface in the same parallel relation for moving the lever transversely and enabling the stripping mechanism to move along its path in any given position of the lever to which it is moved without disturbing such position, means for moving the stripping mechanism in retrograde direction when the stripping elements are in said operative position and the wire is stationary, means adjacent the shaping station for cutting the wire at each stripped portion after completion of the respective shaping operation, and means for operating said means and mechanism in the relation stated.

6. Apparatus of the character disclosed comprising means for shaping wire at a shaping station, means for guiding wire to the shaping station along a predetermined path, means for intermittently feeding continuous wire to the shaping station including unidirectional clutch means anterior to the shaping station operative for moving the wire in feeding direction while enabling the wire to be drawn therethrough in feeding direction, means for operating the shaping means and shaping the continuous wire, the shaping means being operative for pulling the wire thereto in the shaping operation, stripping mechanism anterior to the clutch means movable along the wire path and having stripping elements rotatable at high speed about the axis of the wire and movable radially into and out of operative engagement with the wire, means for moving the stripping elements into said operative position including a lever having a terminal portion positioned laterally of the wire path and movable transversely thereof, actuating elements one of which has a control surface parallel with the wire path and the actuating elements having inclined interengaging surfaces operative for adjustably moving the control surface in transverse directions in response to relative movement of the actuating elements longitudinally, said control surface being uniformly parallel with the wire path in all adjusted positions thereof, said control surface having an operative position in which the lever is disconnectedly engaged thereby and the stripping elements are thereby in said operative position, means for moving the stripping mechanism in retrograde direction when the stripping elements are in said operative position and the wire is stationary, means adjacent the shaping station for cutting the wire at each stripped portion after completion of the respective shaping operation, and means for operating said means and mechanism in the relation stated.

7. Stripping mechanism comprising stripping means movable along an axis internal thereto along which wire to be stripped is adapted to be moved and control means bodily stationary relative to such movement of the stripping means, said stripping means including a plurality of stripping elements disposed around said axis, means for rotating the stripping elements around said axis, means for moving said stripping means along said axis, a lever included in said stripping means for moving the stripping elements radially inwardly and movable therewith along said axis, said lever being disposed laterally of the stripping elements and movable transversely thereof, said stripping elements being biased radially outwardly, said control means including a member having a control surface parallel with said axis and disconnectedly engaging said lever, said member being movable transversely and correspondingly moving the lever and thereby the stripping elements radially inwardly, the disconnected engagement between said member and lever being such as to enable free relative movement therebetween in the movement of the stripping means along said axis, and means for moving said member transversely.

8. The stripping mechanism set forth in claim 7 in which said control means includes actuating elements one of which is said member having said control surface, and said actuating elements have inclined interengaging surfaces operative for moving said member in transverse direction in response to relative movement of the actuating elements longitudinally.

9. The stripping means set forth in claim 7 in which means is included for gripping wire and drawing it along said axis in one direction a predetermined distance and enabling the wire to be drawn therethrough in said one direction.

References Cited in the file of this patent

UNITED STATES PATENTS

| | | |
|---|---|---|
| 1,828,413 | Holmes | Oct. 20, 1931 |
| 1,987,959 | Knuuti | Jan. 15, 1935 |
| 2,239,755 | Montgomery | Apr. 29, 1941 |
| 2,571,078 | Vollmer | Oct. 9, 1951 |
| 2,703,026 | Basile | Mar. 1, 1955 |
| 2,811,063 | Eubanks | Oct. 29, 1957 |
| 2,884,825 | Eubanks | May 5, 1959 |